June 3, 1958   M. R. THORBURN   2,837,086
VISUAL TRAINING DEVICE
Filed March 5, 1952   2 Sheets-Sheet 1

INVENTOR
MILTON R. THORBURN
BY
ATTORNEYS

June 3, 1958 M. R. THORBURN 2,837,086
VISUAL TRAINING DEVICE
Filed March 5, 1952 2 Sheets-Sheet 2

INVENTOR
MILTON R. THORBURN
BY
ATTORNEYS

United States Patent Office 2,837,086
Patented June 3, 1958

2,837,086

VISUAL TRAINING DEVICE

Milton R. Thorburn, Williamsville, N. Y., assignor to American Optical Company, Southbridge, Mass., a voluntary association of Massachusetts Application March 5, 1952, Serial No. 275,006

4 Claims. (Cl. 128—76.5)

This invention relates to improvements in visual training devices and has particular reference to the provision of a novel visual training device and method of making and using the same which is inexpensive in its construction and simple and efficient to operate.

One of the principal objects of this invention is to provide a novel visual training device and method of making and using the same which is relatively simple and economical in construction and adaptable for use under substantially normal conditions of viewing whereby patients may receive efficient and beneficial visual training either in the doctor's office or in the privacy of their homes.

Another object is to provide a simple and efficient visual training device of the above character and method of making and using the same which embodies a visual field comprising a composite imagery having fixed and moving form characters therein with given portions of the fixed and moving form characters being rendered selectively visible to the respective eyes and with the moving form characters being rendered alternately visible to the respective eyes when the patient attempts sustained visual continuity of said composite imagery whereby the moving form characters will function cooperatively with the selectively visible fixed form characters to stimulate the patient's interest and concentration upon said visual field and introduce a desired visual training in attempting to retain said sustained visual continuity.

Another object is to provide a visual training device of the above character embodying light-altering means interposed between a visual field having combined stationary and moving form characters thereon and the eyes of a patient being treated, said light-altering means being so constructed and arranged as to render given areas of said visual field selectively visible to the respective eyes of the patient and the moving form characters in said visual field alternately visible to the respective eyes when the patient attempts sustained visual continuity of said field.

Another object is to provide a visual training device embodying a television receiving unit having a transparent member mounted over the picture area thereof, said transparent member embodying a pair of light-polarizing portions wherein the respective axes of polarization are substantially at right angles to one another and respectively parallel to the axes of polarization of a pair of polarizing analyzers worn by a patient viewing said picture area whereby only desired stationary portions of said picture area will be selectively visible to the respective eyes and the moving form characters traversing said field will be alternately visible to each respective eye when the patient viewing said picture area attempts sustained visual continuity of said area.

Another object is to provide a visual training device of the above character wherein said pair of light-polarizing portions of the transparent member are spaced with respect to one another sufficiently to provide therebetween an unpolarized fusion stimulus area which will enable the patient to obtain single binocular vision of the form characters in said stimulus area during said visual training.

Another object is to provide a visual training device of the above character wherein said light-polarizing portions of said transparent member are movable transversely of the picture area whereby the related sizes of said selectively visible portions of said picture area may be varied as desired.

Other objects and advantages of the invention will become apparent from the following description taken in connection with the accompanying drawing wherein.

Figure 4:
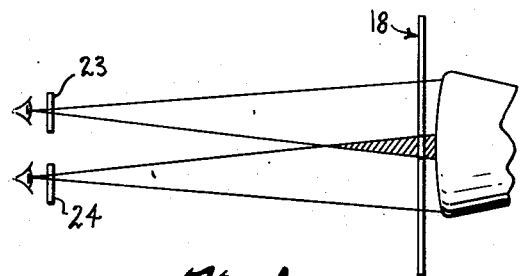
Figure 5:
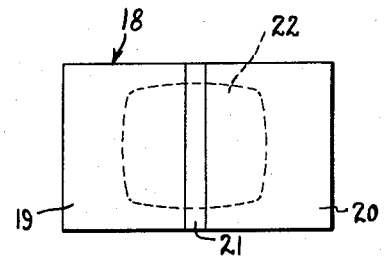
Figure 6:
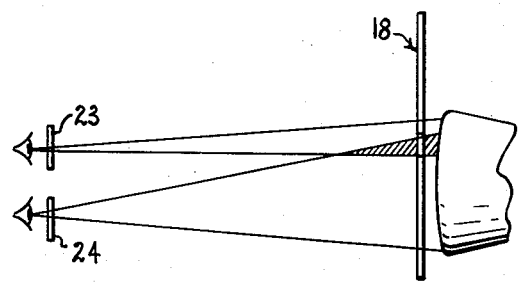
Figure 7:
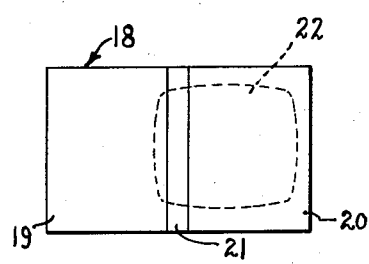
Figure 8:
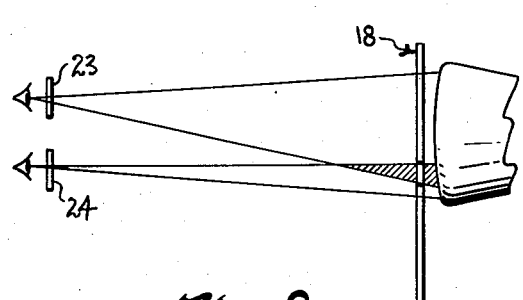
Figure 9:
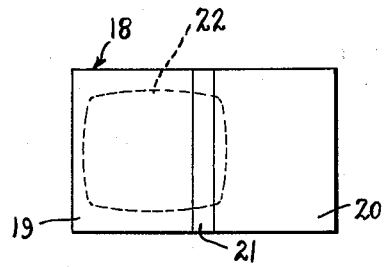

Figs. 4, 6 and 8 are diagrammatic top plan views illustrating the effect of positioning the movable transparent member at various locations with respect to the picture area; and Figs. 5, 7 and 9 are diagrammatic front elevational views illustrating the positional relation of the transparent member to the picture area coinciding with the positions illustrated respectively in Figs. 4, 6 and 8.

It is well known in the visual training field that individuals often have one eye which is dominant due to the other eye being deficient or laggard. In cases where the dominant eye is unconsciously used to a considerable extent suppression of the other eye occurs, which condition is known as amblyopia, and it is desirable that the suppressed or deficient eye be exercised in such a manner that it will be forced into use more than or approaching the amount of use of the dominant eye and thereby eventually bring about a more normal coordination of the two eyes.

Various methods have been employed in an attempt to exercise a suppressed or defective eye, which methods, however, have generally been mechanical and of a somewhat complicated nature requiring a patient to make continued visits to a doctor's office for treatments. The present invention overcomes this objection through the provision of simple and economical means which may be easily attached to and used with a television receiving device or the like whereby the patient may receive efficient and beneficial training more economically and conveniently in the privacy of his home.

Figure 1:
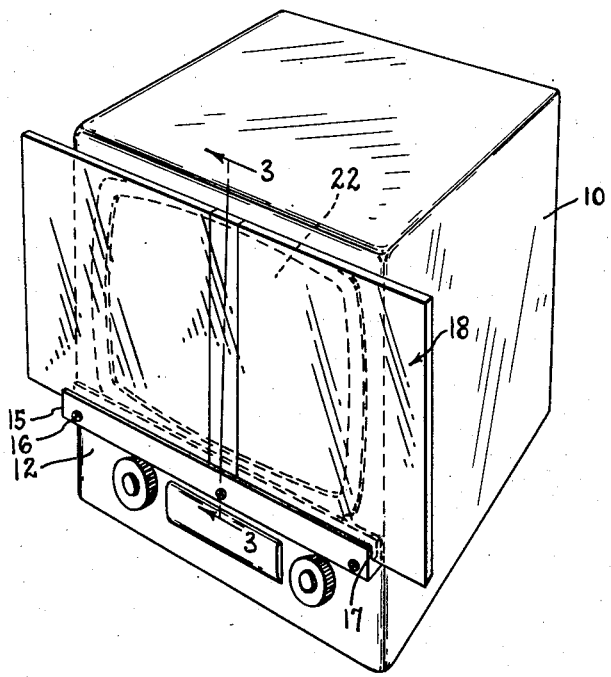
Fig. 1 is a perspective view of a device embodying the invention.
Figure 2:
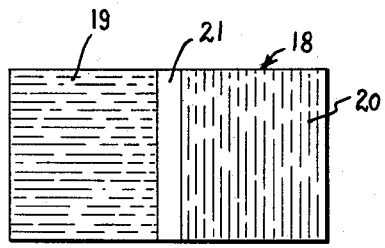
Fig. 2 is a front elevational view of a transparent light-altering member formed in accordance with the invention.
Figure 3:
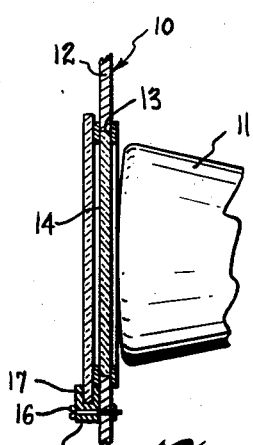
Fig. 3 is a fragmentary vertical sectional view taken substantially on line 3—3 of Fig. 1.

Referring more particularly to the drawings wherein like characters of reference designate like parts throughout the several views, a television receiver 10 of conventional type may be used, the receiver 10 being provided with a conventional cathode ray picture tube 11 (Fig. 3), which is provided with the usual screen upon which moving form characters are formed by conventional electronic methods. The front panel 12 of the receiver 10 is provided with an opening 13 therein in which is provided a protective glass 14, through which a patient views the face of the tube 11. The area of the cathode ray tube 11 which is adapted to be viewed by the patient thus becomes what we shall term the picture area designated by numeral 22.

Attached to the front panel 12 of the receiver 10 beneath the picture area is a transversely disposed supporting member 15 which may be secured to said front panel 12 by bolts 16 or other conventional connecting means. The upper surface of the supporting member 15 is provided with a longitudinal slot 17 therein which is adapted to receive the lower edge of a sheet 18 of transparent material, which sheet 18 is of a size to completely cover the picture area 22 and to extend on each side thereof substantially beyond the picture area. The transparent sheet 18 is preferably formed of plastic or artificial resin and is provided with a pair of left and right polarized areas 19 and 20 respectively. The axis of polarization of the respective polarized areas 19 and 20 are positioned at an angle of substantially 90° with respect to one another, with the axis of each respective left and right eye portion 19 and 20 being substantially parallel with the axis of polarization of respective polarized left and right eye lenses 23 and 24 of a pair of analyzers worn by a patient during the treatment.

Thus, a patient will view through the right lens 24 and right polarized portion 20 only that portion of the picture area which is covered by the portion 20 since the opposed axes of polarization of the right lens 24 and left polarized portion 19 prevents viewing of the remainder of the picture area 22 by the right eye. Accordingly the left eye will view only the portion of the picture area 22 which is covered by the polarized portion 19 having its axis of polarization substantially parallel with the axis of polarization of the left lens 23. Between the polarized areas 19 and 20 is preferably located a vertically elongated clear transparent fusion stimulus portion 21 which does not possess polarizing characteristics. This permits binocular fusion of the patient's eyes when he views the portion of the picture area 22 adjacent the fusion stimulus portion 21 and thus tends to introduce a cooperative effort on the part of both eyes during treatment.

In using the device, the transparent member 18 is positioned with its lower edge in the slot 17, and with its vertically disposed unpolarized fusion stimulus portion 21 located substantially at the center of the picture area 22, as shown in Fig. 5. The patient will then view the picture area 22 through the pair of polarizing analyzers which embody the lenses 23 and 24, and will see with his right eye through lens 24 and polarized portion 20 only that portion of the picture area which can be seen through the portion 20 and unpolarized portion 21.

The entire picture area in a device of the above character forms a composite imagery which, when the television receiver is in operation, has both fixed and moving form characters therein with portions of the composite imagery being rendered selectively visible only to the respective eyes and with the moving form characters being rendered alternately visible to the respective eyes when the patient attempts visual continuity thereof during sustained viewing of the television screen as the moving form characters traverse said composite imagery whereby said composite imagery will stimulate the patient's interest and concentration and introduce a desired visual effort in attempting to maintain sustained visual continuity.

With his left eye, as has been stated above, the patient will view through the lens 23 only the portion of the picture area which can be seen through the corresponding polarized portion 19 and also through the unpolarized portion 21. This is illustrated in Fig. 4 wherein the shaded area indicates the fusion stimulus area which can be viewed with both eyes simultaneously and thus permit binocular fusion of the patient's eyes.

In the example illustrated in Figs. 6 and 7, the transparent member is moved to the left whereupon a greater portion of the picture area 22 is rendered visible to the right eye while only a small portion thereof is rendered visible to the left eye. Figs. 8 and 9 illustrate the effect of moving the transparent member 18 to the right whereupon a greater portion of the picture area is visible to the left eye than is visible to the right eye.

From the foregoing, it will be apparent that as a patient views moving form characters formed by the television cathode ray tube and tries to assimilate the entire composite imagery, his eyes will tend to follow the form characters as they traverse the picture area 22 and with the background of fixed characters being visible his interest will be increased and consequently he will concentrate on the picture area. For example, if a moving form character such as an animal is viewed at the right side of the picture area 22 against a scenic background, it will be viewed by the right eye only, since the axis of polarization of the adjacent right polarized portion 20 of the transparent member 18 is substantially at right angles to the axis of polarization of the lens 23 which is located before the left eye. Then, as the animal moves across the scene transversely of the picture area 22, it will come into the area which is superimposed by the unpolarized fusion stimulus portion 21 of the transparent member 18 whereupon both the right and left eyes will be permitted to focus upon and view the animal. Then, upon continued movement of the animal to the left side of the picture area with a different background, it will be rendered visible only to the left eye since the axis of polarization of the adjacent left portion 19 of the transparent member 18 is substantially parallel with the axis of polarization of the lens 23 located before the left eye.

If it is desired that one eye be exercised and used more than the other eye during the treatment, the transparent member is accordingly moved either to the left or the right as shown in Figures 6 through 9 whereupon a greater portion of the picture area can be rendered visible to the eye needing the additional exercise.

It is desirable for most efficient use of a device of this character that all three of the portions of the transparent member 18 be made equally transparent since it has been found that if one area is denser or clearer than another, this may cause the patient to evidence a slight amount of discomfort.

Although the foregoing description refers particularly to a transparent member adapted to be superimposed before a television screen, it is to be understood that a transparent member of this type can be equally well adapted for superimposition with a translucent screen on which moving pictures are projected by conventional projection methods. In either case, a single picture area containing form characters is provided with said form characters having continuity of action and being movable from the field of vision of one eye into the field of vision of the other eye.

From the foregoing description, it is evident that a device formed in accordance with the above teaching is simple in construction, arrangement, and operation thereby rendering it possible for home use.

It is apparent that all of the objects and advantages of the invention have been accomplished. It will be apparent, however, that many changes may be made in the details of construction, arrangement of parts, and method shown and described without departing from the spirit of the invention as expressed in the accompanying claims. Therefore, it is to be understood that all matter set forth or shown in the accompanying drawings is to be interpreted as illustrative and not in a limiting sense.

I claim:

1. Eye training apparatus for use with a device providing a visual field of fixed size and shape having moving form character thereon to stimulate the observer's interest comprising a transparent member of a size to cover said visual field and means for supporting said member on the device over said visual field, said transparent member being divided into two adjacent principal areas having light polarizing characteristics, the axis of polarization of which areas are substantially at right angles to each other, and separated by a narrow nonpolarizing transparent area of substantially the density of said principal areas, and a pair of polarizing analyzers to be located before the eyes of an observer under training, said analyzers having their axes of polarization at substantially right angles to each other and parallel with the axis of polarization of one of said areas of the transparent member, said apparatus requiring vision through both analyzers to see the whole visual field whereby as said form character move into and out of the parts of the visual field covered by each of said areas of the transparent member the observer will be encouraged to attempt binocular viewing in order to follow said form character.

2. A visual training device for use in treating individuals having a tendency to suppress vision in one eye comprising a visual field of fixed size and shape having moving form characters therein positioned within the field of vision of the eyes of an individual to stimulate his interest, viewing means interposed between said visual field and the eyes of the individual through which said field is adapted to be viewed, and light altering means interposed between said viewing means and said visual field comprising a transparent member having a first light polarizing portion and a second light polarizing portion wherein the axes of polarization of the respective portions are substantially at right angles to one another and separated by an intermediate nonpolarizing portion, said viewing means comprising a pair of light polarizing lenses the respective axes of polarization of which are substantially at right angles to one another and substantially parallel with the axes of polarization of the respective portions of said light altering means requiring vision through both lenses to see the whole of said visual field and the moving form characters traversing said visual field so as to encourage attempts at binocular viewing by the individual to follow said form characters, said intermediate nonpolarizing portion of said transparent member disposed between said first and second polarizing portions stimulating binocular fusion when the individual views said visual field through said intermediate portion.

3. A visual training device for use in treating individuals having a tendency to suppress vision in one eye comprising a visual field of fixed size and shape having moving form characters therein positioned within the field of vision of the eyes of an individual to stimulate his interest, viewing means interposed between said visual field and the eyes of the individual through which said field is adapted to be viewed, and light altering means interposed between said viewing means and said visual field comprising a sheet of transparent material having substantially uniform light absorptive characteristics throughout and embodying a pair of spaced light polarizing portions the axes of polarization of which are substantially at right angles to one another and an unpolarizing transparent portion between said spaced polarizing portions, said viewing means embodying a pair of light polarizing lenses adapted to be positioned before the respective eyes of the individual with the axes of polarization thereof being disposed substantially parallel with the axes of polarization of the respective polarizing portions of said light altering means requiring vision through both lenses to see the whole of said visual field, said form characters traversing said visual field to encourage the individual in viewing said form characters to attempt binocular visual continuity during sustained viewing of said visual field, with said intermediate portion of said light altering means permitting binocular vision of the central region of said field to further stimulate said binocular viewing by the individual as he views said visual field.

4. Eye training apparatus for use with a device providing a visual field of fixed size and shape having moving form characters thereon to stimulate the observer's interest comprising a transparent member of a size to cover said visual field and means for supporting said member on the device over said visual field, said transparent member being divided into two adjacent principal areas having different light-altering characteristics for use with a pair of viewing means adapted to be positioned before the eyes of an observer and through which the visual field is adapted to be viewed, said viewing means each embodying different light-altering characteristics for cooperation with the respective principal areas of said transparent member to render one of each of said principal areas visible only to a respective eye of the observer thereby requiring the use of both eyes of the observer to see the whole of said visual field and transparent means intermediate said principal areas having characteristics which are such as to permit binocular vision of the central region of said visual field to further stimulate binocular viewing by the observer as he views said visual field through said viewing means.

References Cited in the file of this patent

UNITED STATES PATENTS

| | | |
|---|---|---|
| 1,729,617 | Kelley et al. | Oct. 1, 1929 |
| 2,233,689 | Wildebush | Mar. 4, 1941 |
| 2,238,207 | Ames et al. | Apr. 15, 1941 |
| 2,280,297 | Neumueller et al. | Apr. 21, 1942 |
| 2,670,654 | Norman | Mar. 2, 1954 |
| 2,676,588 | Shamsky | Apr. 27, 1954 |

FOREIGN PATENTS

| | | |
|---|---|---|
| 264,615 | Great Britain | Jan. 27, 1927 |

OTHER REFERENCES

Burian: Archives of Ophthalmology, March 1939, vol. 21, pages 486–491.